United States Patent [19]

Kawamoto et al.

[11] Patent Number: 4,869,427

[45] Date of Patent: Sep. 26, 1989

[54] SHOWER SYSTEM

[75] Inventors: Ryuichi Kawamoto; Shigeru Sakakibara, both of Aichi; Kazuyuki Wakahara, Gifu; Ikutoshi Nebashi, Aichi, all of Japan

[73] Assignees: Inax Corporation, Tokoname; Chubo Electric Power Co., Inc., Nagoya, both of Japan

[21] Appl. No.: 213,297

[22] Filed: Jun. 29, 1988

[30] Foreign Application Priority Data

Jul. 7, 1987 [JP] Japan .................. 62-170089

[51] Int. Cl.⁴ .......................................... G05D 23/13
[52] U.S. Cl. ................. 236/12.12; 137/565; 137/624.15
[58] Field of Search ................. 236/12.12, 12.11, 12.1; 137/624.13, 624.14, 624.15, 565; 4/615, 616; 417/42, 43

[56] References Cited

U.S. PATENT DOCUMENTS

| | | | |
|---|---|---|---|
| 1,937,448 | 11/1933 | Trautwein | 137/565 |
| 2,991,481 | 7/1961 | Book | 4/1 |
| 4,322,031 | 3/1982 | Gehlert | 236/12.1 |
| 4,563,780 | 1/1986 | Pollack | 4/192 |
| 4,682,728 | 7/1987 | Ordenhoven et al. | 236/12.12 |
| 4,696,428 | 9/1987 | Shakalis | 236/12.12 |
| 4,711,392 | 12/1987 | Kidouchi et al. | 236/12.12 |

FOREIGN PATENT DOCUMENTS

| | | |
|---|---|---|
| 0195271 | 9/1986 | European Pat. Off. . |
| 0037527 | 3/1980 | Japan .................. 417/43 |
| 0212388 | 12/1982 | Japan .................. 417/43 |
| 2048466 | 12/1980 | United Kingdom . |
| 2078354 | 1/1982 | United Kingdom . |

Primary Examiner—Harry B. Tanner
Attorney, Agent, or Firm—Arnold, White & Durkee

[57] ABSTRACT

Water and hot water from a water storage tank and a hot water storage tank, respectively, are mixed in a mixing valve, are pressured up by a pump, and outflow from a shower head. The motor for the mixing valve and the pump are driven so that a signal is output from the controller to the regulator of the motor for altering the mixing ratio of hot water to water in the mixing valve and the regulator of the pump thereby to obtain objective water temperature and water pressure.

8 Claims, 3 Drawing Sheets

SHOWER SYSTEM

BACKGROUND OF THE INVENTION

1. Field of the Invention

The present invention relates to a shower system in which it is easy to control the water temperature and the discharge pressure of a shower flow discharged from a shower head and it is also easy to alter them.

2. Discussion of the Prior Art

In a conventional shower system furnished in a bathroom, etc. which is being used in general, hot water fed from a hot water supply unit and water fed from a service water pipe are mixed by means of a mixing valve to obtain hot water at a desired temperature, which is fed to a shower head connected to the secondary side of the mixing valve so as to be discharged as a shower flow from said shower head.

In above said conventional shower system, it is required to operate a handle provided on a mixing valve for adjusting the mixing ratio and the rate of flow of hot water in order to alter the discharge pressure and the water temperature of the shower flow to be discharged. Thereupon, it is required usually to repeat handle operation very often in many cases until the discharge state of the shower flow reaches a desired state. Accordingly, the adjusting work by means of said handle operation has been very complicated. Furthermore, the hot water feeding pressure from the hot water supply unit to the mixing valve and the water supply pressure from a service water pipe to the mixing valve being unstable, the feeding pressure and the temperature of hot water fed from the mixing valve to the shower head are apt to be varied. Therefore, in a conventional shower system, it has also been very difficult to maintain a uniform discharge state of the shower flow.

OBJECT AND SUMMARY OF THE INVENTION

It is an object of the present invention to provide a shower system which is able to alter the discharge state of a shower flow easily.

It is another object of the present invention to provide a shower system which is able to maintain the discharge state of a shower flow constant even if the supply water pressure fluctuates It is still another object of the present invention to provide a shower system which is able to vary the discharge state of a shower flow in a synchronous manner.

Other objects will become apparent from the following description.

A shower system according to the present invention provides a shower system consisting of a water storage tank, a hot water storage tank, a mixing valve, a motor operating the mixing valve, a controller of said motor, a pump and a shower head, in which water fed from the water storage tank and hot water fed from the hot water storage tank are mixed at an appropriate ratio by means of the mixing valve so as to obtain hot water at a desired temperature, and said hot water is fed to the shower head with a pump so as to be discharged from the shower head at a desired discharge pressure, in which there is provided a controller capable of controlling the mixing ratio of hot water to water in said mixing valve and the feeding pressure of hot water in said pump.

The shower system of the present invention may be also provided with a memory for storing the initialization value of the mixing ratio of hot water to water in the mixing valve.

This shower system may be composed in such a manner that synchronous variations of the discharge pressure of the pump and the mixing ratio of hot water to water in the mixing valve are stored, and control signals forming a pattern of such variations are output to respective regulators from the controller. This pattern of variations may be modified, and it is preferable to store the modified pattern. This system may also be composed in such a manner that water in the valve is detected, and control signals are output from the controller to the motor regulator of the mixing valve so that the detected water temperature reaches an objective water temperature.

In this system, when a pump is driven by a command from a controller, water from a water storage tank and hot water from a hot water storage tank are fed to a mixing valve, respectively. Since the mixing ratio of hot water to water in said mixing valve is controlled by the controller at a predetermined ratio, hot water which is adjusted at a desired temperature is discharged from the mixing valve. Said hot water being fed to the shower head under a predetermined pressure by means of said pump, a shower flow under an objective discharge pressure is discharged from said shower head.

According to the present invention, since a water storage tank and a hot water storage tank are used as a water source and a hot water source, respectively, feeding pressures of water and hot water to the mixing valve are stabilized. Accordingly, the feeding pressure and the temperature of hot water fed to the shower head from the mixing valve do not fluctuate, even if the supply water pressure of the service water pipe and the hot water feeding pressure of the hot water supply unit fluctuate, so the discharge state of the shower flow is maintained under a uniform state. Furthermore, according to the present invention, the mixing ratio of hot water to water in the mixing valve and the feeding pressure of hot water in the pump are controlled by means of a controller. Therefore, the discharge pressure and the temperature of the shower flow may be made to coincide with the target value simply and quickly.

Accordingly, those who take a shower using the system of the present invention may obtain a shower flow at comfortable temperature and discharge pressure they desire.

Since the feeding pressure of the pump and the mixing ratio of hot water to water in the mixing valve are memorized with a controller, this system has excellent reproducibility for a desired discharge state of the shower flow.

By providing the discharge state of the shower flow from the shower head of this system with periodic variation, massage effect is exhibited. Such massage effect is still further promoted by the synergism of executing both high low variation of the discharge pressure and hot-cold variation of the water temperature at the same time.

DETAILED DESCRIPTION OF THE INVENTION

Figure 1:
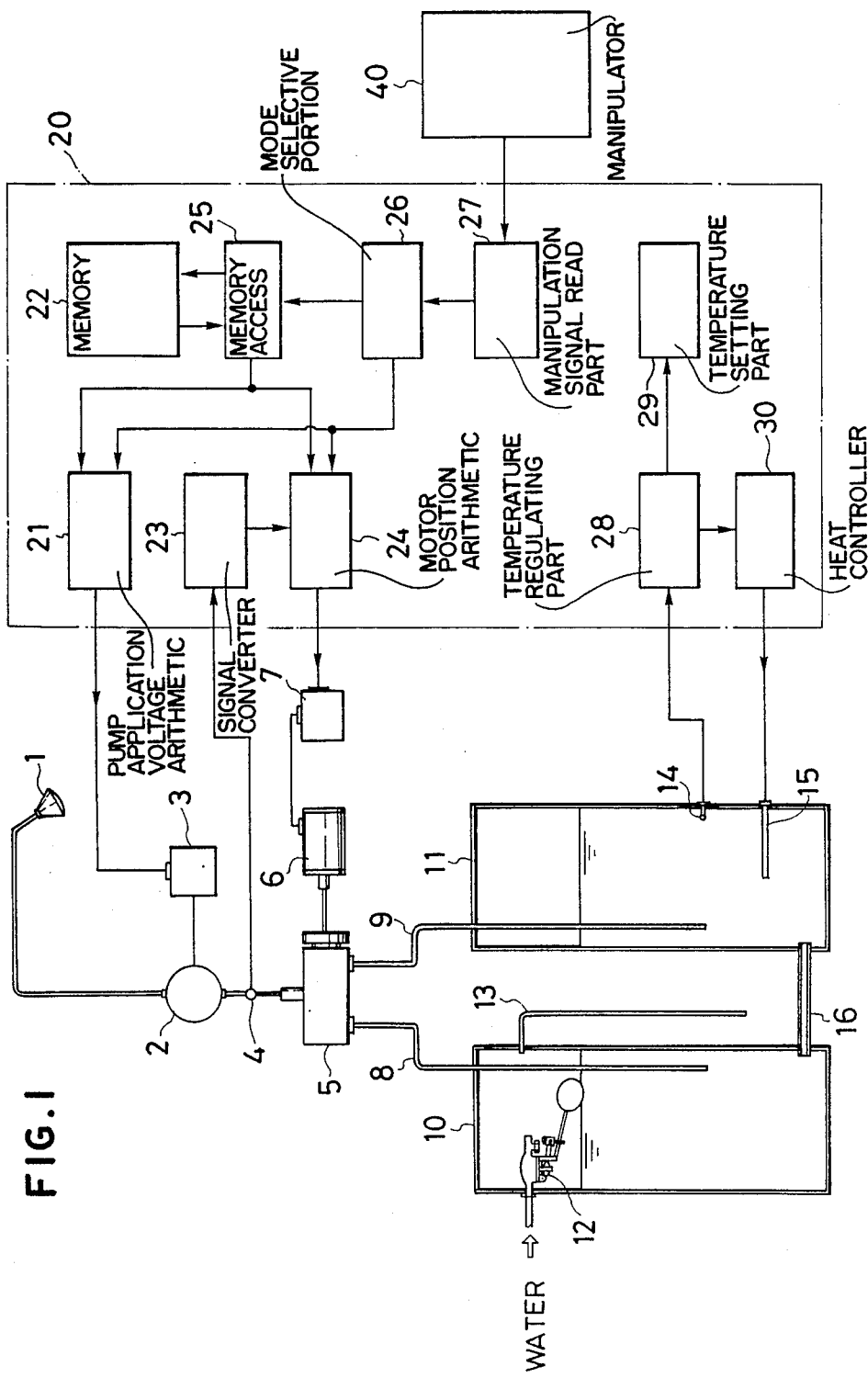
FIG. 1 is a block diagram showing the whole of a shower system.

The outline of a shower system according to the present invention will be described with reference to FIG. 1 showing an embodiment. A water storage tank 10 and a hot water storage tank 11 are connected with a mixing valve 5 by a feeding pipe 8 and a hot water feeding pipe 9, respectively Water fed from the water storage tank 10 and hot water fed from the hot water storage tank 11 are mixed in the mixing valve 5 at an appropriate ratio so as to obtain hot water at a desired temperature. Said hot water is fed to a shower head 1 with a pump 2 provided on a secondary side of the mixing valve 5 and discharged from said shower head 1 at a desired discharge pressure.

To the pump 2 is connected a voltage controller 3. By controlling the voltage applied to the pump 2 with a voltage controller 3, the feeding pressure of hot water to the shower head 1 is adjusted thereby to set the discharge pressure of the shower flow discharged from the shower head 1 to a desired valve.

With the mixing valve 5 is coupled a water temperature regulating motor 6. Said water temperature regulating motor 6 is used for the purpose of altering the mixing ratio of hot water to water by moving a valve body contained inside of the mixing valve 5. A motor driver 7 is connected to said water temperature regulating motor 6, and the water temperature regulating motor 6 is driven by the output of the motor driver 7 so as to move the valve body in the mixing valve 5 thereby to regulate the temperature of discharged hot water to a set value. Besides, it is desirable to provide a discharge temperature sensor 4 on the downstream side of the mixing valve 5. When the mixing valve 5 is a valve with a temperature sensing thermostat, however, it is possible to omit said discharge temperature sensor 4.

In the present embodiment, bottom parts of the water storage tank 10 and the hot water storage tank 11 are communicated with each other by means of a communicating pipe 16. Accordingly, if a ball tap 12 is provided only in the water storage tank 10, water is replenished automatically also to the hot water storage tank 11. Here, it is desired to install an overflow pipe 13 in either of the water storage tank 10 or the hot water storage tank 11. Furthermore, it is also possible to omit said communicating pipe 16 by installing the ball tap 12 in the hot water storage tank 11, too.

A hot water temperature sensor 14 for temperature control and a heater 15 for heating are provided in the hot water storage tank 11. A controller 20 controls the heater 15 intermittently based on a signal from the hot water temperature sensor 14, thereby the hot water temperature in the hot water storage tank 11 is maintained at a set temperature. Besides, in order to supply hot water in a stable manner to the shower head 1, it is desirable that sufficient volume of hot water is contained in the hot water storage tank 11. To be concrete, it is desirable that said volume is over 20 to 40 liters when the set temperature of the hot water is at 60° C.

The controller 20 controls the feeding pressure and the temperature of the hot water for the purpose of discharging the hot water from the shower head 1 under a discharge state desired by the user. A manipulator 40 is connected to said controller 20, and the output from the voltage regulator 3 to the pump 2 and the output from the motor driver 7 to the water temperature regulating motor 6 are controlled based on the input signal from said manipulator 40. Further, the controller 20 also has a function of regulating the hot water temperature in the hot water storage tank 11 based on the temperature signal from the hot water temperature sensor 14 provided in the hot water storage tank 11.

Figure 2:
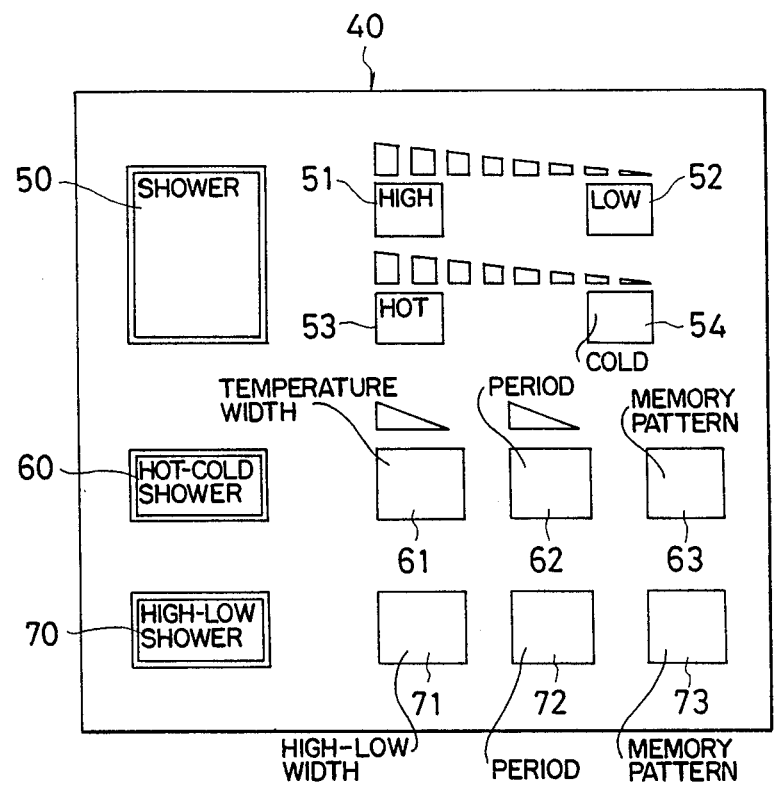
FIG. 2 shows an example of the display portion of a manipulator.

Said manipulator 40 includes a display part disposed with manipulation buttons such as those shown in FIG. 2. In order to start discharge of hot water from the shower head 1, a button 50 at "SHOWER" on the manipulator 40 is pressed first. Then, a signal is output from the manipulator 40 to a manipulation signal read part 27, and said signal is input to a memory access portion 25 through a mode selective portion 26. Said memory access portion 25 makes access to an initialization value which has been stored in advance in a memory part 22 and sends the signal to a pump application voltage arithmetic portion 21 and a motor position arithmetic portion 24. The pump application voltage arithmetic portion 21 applies the output to the voltage regulator 3 and drives the pump 2 with a predetermined application voltage. The motor position arithmetic portion 24 applies the output to the motor driver 7 and drives the water temperature regulating motor 6 so as to set the mixing ratio of hot water to water in the mixing valve 5 at a predetermined ratio. When there is a difference between the temperature of hot water discharged from the mixing valve 5 and the initialized water temperature, a correction signal is output from the motor position arithmetic portion 24 to the motor driver 7 based on the output of a signal converter portion 23 which has received the signal from the discharge temperature sensor 4. Thus, at the start of using the shower, a shower flow at an initialized discharge pressure and temperature is discharged from the shower head 1.

When it is desired to alter the discharge pressure of the shower flow, it is only required to press a "high" button 51 or a "low" button 52 of the manipulator 40. By pressing the "high" button 51 or the "low" button 52, the signal which is output to the manipulation signal read portion 27 is input to the pump application voltage arithmetic portion 21 from the mode selective portion 26, and outputs a signal for altering the application voltage of the pump 2 to the voltage regulator 3. Besides, in the present embodiment, it is arranged so that the pump application voltage is increased or decreased continuously or step-wise corresponding to the time of pressing the "high" button 51 or the "low" button 52 continuously.

Alteration of the shower water temperature is made in the similar manner as above. That is, by pressing a "hot" button 53 or a "cold" button 54, a signal for driving the water temperature regulating motor 6 is output from the motor position arithmetic portion 24 to the motor driver 7. Further, it is preferable that the time of pressing the "hot" button 53 or the "cold" button 54 continuously and the driving quantity of the water temperature regulating motor 6 are made to correspond to each other.

Figure 3:
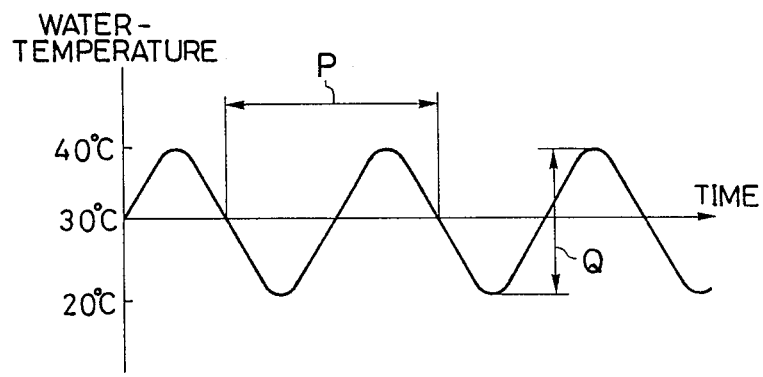
FIG. 3 is a graph showing the state in which the water temperature of the shower flow is varied periodically.

In abovementioned shower system according to the present invention, it is possible not only to alter the discharge pressure and the water temperature temporarily, but also to provide periodic variation in the discharge pressure and the water temperature of the shower flow. When a "hot-cold shower" button 60 of the manipulator 40 is pressed, a signal for driving the water temperature regulating motor 6 periodically is output from the motor position arithmetic portion 24 to the motor driver 7 based on an information stored in advance in the memory portion 22. With this, the mixing ratio of hot water to water in the mixing valve 5 is varied periodically. Accordingly, the temperature of the shower flow discharged from the shower head 1 is varied at a predetermined period P and the temperature width Q (for example, 30±10° C., 39±2° C., etc.) as illustrated in FIG. 3. Besides, it is arranged so that said temperature width Q may be altered by means of a "temperature width" button 61, and said period P may be altered by means of a "period" button 62 of the manipulator 40, respectively. Furthermore, it is possible to have a newly set temperature variation pattern stored in the memory portion 22 by providing a "memory pattern" button 63.

Figure 4:
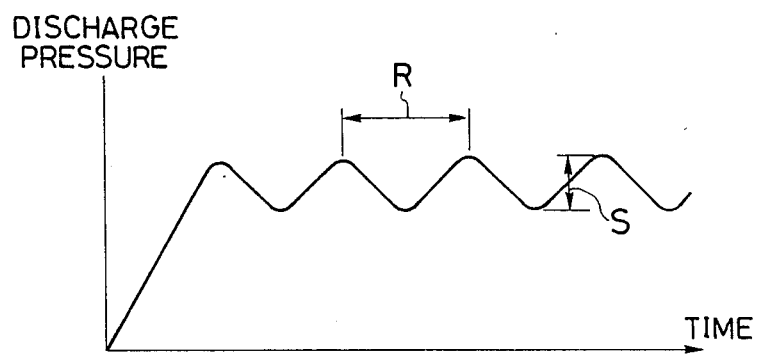
FIG. 4 is a graph showing elapsed variation of the discharge pressure of the shower flow.

Similarly, it is also possible to have the discharge pressure of the shower flow vary periodically. That is, by pressing a "high-low shower" button 70 of the manipulator 40, a signal for varying the application voltage periodically is output from the pump application voltage arithmetic portion 21 to the voltage regulator 3, thereby the hot water feeding pressure of the pump 2 to the shower head 1 is varied periodically. Accordingly, the discharge pressure of the shower flow discharged from the shower head 1 is varied periodically as shown in FIG. 4, for instance. Further, it is arranged in such a manner that the pressure width S may be altered by pressing the "high-low width" button 71 and the period R may be modified by pressing the "period" button 72 of the manipulator 40, respectively, and furthermore, a discharge pressure variation pattern after modification may be stored by pressing the "memory pattern" button 73.

Besides, control of the hot water temperature in the hot water storage tank 11 is performed as follows. The controller 20 is connected to the hot water temperature sensor 14 and the heater 15 installed in the hot water storage tank 11. In a temperature regulating part 28 of the controller 20, the temperature information from a temperature setting part 29 and the temperature information from the hot water temperature sensor 14 are compared with each other. Then, a heater controller 30 controls the heater 15 intermittently based on the result of comparison mentioned above, thereby to maintain the hot water temperature of the hot water storage tank 11 at the set value.

What is claimed is:

1. A shower system comprising a water storage tank, a hot water storage tank, a mixing valve downstream of the storage tanks, a motor for operating the mixing valve, control means for said motor, a pump, control means for the pump and a shown head, such that water fed from the water storage tank and hot water fed from the hot water storage tank are mixed at an appropriate ratio by the mixing valve so as to obtain hot water at a desired temperature, and said pump feeds said hot water to the shower head so as to be discharged from the shower head, said system further comprising a controller for controlling the control means of said motor for the mixing valve and the control means of said pump, and a manipulator for inputting manipulation signals to said controller.

2. A shower system according to claim 1, wherein said controller is provided with memory means of an initialization set value of a mixing ratio of hot water to water in the mixing valve.

3. A shower system according to claim 2, wherein said memory means of the controller store periodical variation patterns of the discharge pressure of the pump, and a signal which varies the discharge pressure of the pump periodically in accordance with these patterns may be output to the pump control means from the controller.

4. A shower system according to claim 2, wherein said memory means of the controller store periodical variation patterns of the mixing ratio of hot water to water in the mixing valve, and a signal varying the mixing ratio periodically in accordance with these patterns may be output to the motor control means from the controller.

5. A shower system according to claim 3, wherein said manipulator and controller are provided with means for modifying the variation patterns, and said memory means are capable of storing the modified variation patterns.

6. A shower system according to claim 1, wherein a sensor is provided for detecting the temperature of the mixed water, a detected temperature signal of this sensor is input to the controller, and a control signal is output from the controller to motor control means for the mixing valve so that the detected temperature reaches the objective temperature.

7. A shower storage system comprising a water storage tank, a hot water storage tank, a mixing valve downstream of said water and hot water storage tanks, means for controlling the mixing valve to obtain water at a desired temperature, a pump downstream of said mixing valve, a shower head, and means for controlling the pump, said means for controlling the pump including means for producing controlled oscillating discharge pressures from said shower head.

8. The shower system according to claim 7 in which said mixing valve control means includes means for providing controlled oscillating discharge temperatures.

* * * * *